United States Patent
Ke (10) Patent No.: US 11,106,933 B2
(45) Date of Patent: Aug. 31, 2021

(54) METHOD, DEVICE AND SYSTEM FOR PROCESSING IMAGE TAGGING INFORMATION

(71) Applicant: BAIDU ONLINE NETWORK TECHNOLOGY (BEIJING) CO., LTD., Beijing (CN)

(72) Inventor: Haifan Ke, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 53 days.

(21) Appl. No.: 16/390,727

(22) Filed: Apr. 22, 2019

(65) Prior Publication Data

US 2020/0005073 A1 Jan. 2, 2020

(30) Foreign Application Priority Data

Jun. 27, 2018 (CN) .......................... 201810678882.5

(51) Int. Cl.
*G06K 9/46* (2006.01)
*G06K 9/66* (2006.01)
*G06K 9/00* (2006.01)

(52) U.S. Cl.
CPC ....... *G06K 9/4609* (2013.01); *G06K 9/00201* (2013.01); *G06K 9/00637* (2013.01); *G06K 2009/4666* (2013.01)

(58) Field of Classification Search
None
See application file for complete search history.

(56) References Cited

U.S. PATENT DOCUMENTS 7,272,501 B2 * 9/2007 Dorfman .............. G06Q 30/018
  701/484
7,751,805 B2 * 7/2010 Neven .................. G06K 9/6857
  455/414.3

(Continued)

FOREIGN PATENT DOCUMENTS

JP       4946238 B2    6/2012
KR  1020150037104 A    4/2015
KR     101823464 B1    3/2018

OTHER PUBLICATIONS

Fuentes-Pacheco et al., "Visual simultaneous localization and mapping: a survey." Artificial intelligence review 43, No. 1 (2015): 55-81. (Year: 2015).*

(Continued)

*Primary Examiner* — Feng Niu
(74) *Attorney, Agent, or Firm* — Lathrop GPM LLP (57) ABSTRACT

The present disclosure provides a method, a device and a system for processing image tagging information. The method includes the following. A captured image and a capturing position are acquired from a terminal. Object recognition is applied to the captured image to determine a first object presented by the captured image. A first target image presenting the first object is searched for among one or more historical images associated with the capturing position. When the first target image is searched for, it is determined that the first object is duplicated with tagging information of an electronic map. When the first target image is not searched for, a corresponding position of the first object on the electronic map is tagged.

15 Claims, 5 Drawing Sheets

(56) References Cited

U.S. PATENT DOCUMENTS

| | | | |
|---|---|---|---|
| 8,098,899 B2* | 1/2012 | Ohashi | G06K 9/32 382/113 |
| 8,103,091 B2* | 1/2012 | Hosoi | G06K 9/38 382/157 |
| 8,594,460 B2* | 11/2013 | Lindskog | G06T 11/00 382/290 |
| 8,611,673 B2* | 12/2013 | Aarabi | G06F 16/5854 382/209 |
| 9,292,762 B2* | 3/2016 | Yui | G06K 9/4661 |
| 9,429,438 B2* | 8/2016 | Weng | G01C 21/32 |
| 2006/0240862 A1 | 10/2006 | Neven | |
| 2007/0043504 A1* | 2/2007 | Dorfman | G06Q 30/0244 701/484 |
| 2007/0110316 A1* | 5/2007 | Ohashi | G06F 16/58 382/195 |
| 2007/0236575 A1* | 10/2007 | Jokinen | H04N 5/225 348/207.99 |
| 2008/0056562 A1* | 3/2008 | Hosoi | G06K 9/38 382/155 |
| 2009/0228204 A1* | 9/2009 | Zavoli | G01S 19/49 701/532 |
| 2010/0176987 A1* | 7/2010 | Hoshizaki | G01S 19/48 342/357.23 |
| 2011/0200259 A1* | 8/2011 | Lindskog | G06T 5/005 382/201 |
| 2011/0249144 A1* | 10/2011 | Chang | G11B 27/28 348/231.3 |
| 2011/0310087 A1* | 12/2011 | Wright, Jr. | G06T 19/003 345/419 |
| 2012/0087592 A1 | 4/2012 | Kim et al. | |
| 2012/0166074 A1* | 6/2012 | Weng | G01C 21/32 701/409 |
| 2014/0270536 A1* | 9/2014 | Amtrup | G06K 9/00483 382/195 |
| 2014/0347492 A1* | 11/2014 | Fales | G01C 11/06 348/164 |
| 2015/0049935 A1* | 2/2015 | Yui | G06T 7/0012 382/132 |
| 2016/0048934 A1* | 2/2016 | Gross | G06K 9/4642 705/313 |
| 2016/0078273 A1* | 3/2016 | Hamid | G06K 9/2081 382/103 |
| 2016/0379080 A1* | 12/2016 | Yalniz | G06K 9/00208 382/164 |
| 2018/0189609 A1* | 7/2018 | Park | G06K 9/00979 |
| 2019/0164004 A1* | 5/2019 | Chen | G06T 3/4092 |

OTHER PUBLICATIONS

European Patent Application No. 19169911.5, Extended Search and Opinion dated Jun. 11, 2019, 8 pages.
Japanese Patent Application No. 2019-031625, Office Action dated Sep. 10, 2019, 4 pages.
Japanese Patent Application No. 2019-031625, English translation of Office Action dated Sep. 10, 2019, 4 pages.
Korean Patent Application No. 1020190022362, First Office Action dated Jun. 1, 2020, 8 pages.
Korean Patent Application No. 1020190022362, English translation of First Office Action dated Jun. 1, 2020, 7 pages.

* cited by examiner

METHOD, DEVICE AND SYSTEM FOR PROCESSING IMAGE TAGGING INFORMATION

CROSS REFERENCE TO RELATED APPLICATION

This application claims a priority to Chinese Patent Application No. 201810678882.5, filed on Jun. 27, 2018, the entire contents of which are incorporated herein by reference.

TECHNICAL FIELD

The present disclosure relates to a field of electronic map, and more particular, to a method, a device and a system for processing image tagging information.

BACKGROUND

In an electronic map, a point of interest (POI) is one of important elements of a geographic information system. With rapid development of urbanization construction, data of the electronic map is changing with each passing day. Accuracy requirement by the user to the POI information is increasing. Therefore, ability of the electronic map to quickly and accurately collect POIs is particularly important.

SUMMARY

Embodiments of the present disclosure provide a method and a system for processing image tagging information, a server, a non-transitory computer readable storage medium and a computer program product.

The method for processing image tagging information includes: acquiring a captured image and a capturing position from a terminal; applying object recognition to the captured image, to determine a first object presented by the captured image; searching for a first target image presenting the first object among one or more historical images associated to the capturing position; determining that the first object is duplicated with tagging information on an electronic map in response to that the first target image is searched for; and tagging a corresponding position of the first object on the electronic map according to the capturing position in response to that the first target image is not searched for.

The server includes a processor, a memory and computer programs stored on the memory and executable by the processor. When the computer programs are executed by the processor, the method for processing image tagging information according to above embodiments is executed.

The system for processing image tagging information includes a terminal and a server.

The terminal is configured to acquire a captured image and to send the captured image and a capturing position to the server.

The server is configured to execute a method for processing image tagging information according to above embodiments based on the captured image and the capturing position.

The non-transitory computer readable storage medium has computer programs stored thereon. When the computer programs are executed by a processor, a method for processing image tagging information according to above embodiments is executed.

The computer program product has instruction stored therein. When instructions in the computer program product is executed by a processor, a method for processing image tagging information according to above embodiments is executed.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Embodiments of the present disclosure will be described in detail and examples of embodiments are illustrated in the drawings. The same or similar elements and the elements having same or similar functions are denoted by like reference numerals throughout the descriptions. Embodiments described herein with reference to drawings are explanatory, serving to explain the present disclosure and being not construed to limit embodiments of the present disclosure.

In related arts, data collection such as the collection of POIs through the electronic map may be performed by a professional team of collecting data. After the data is preprocessed, the data may be comprehensively stored by a professional mobile device, and may be transferred by means of a mobile storage medium. After the transferring, the data may be processed by a professional team of processing data with professional tools, so as extract accurate POI data information, thereby realizing to update the POIs on the electronic map. However, in this way, the process from the data collection to the data processing takes a long time. In addition, the professional team spends a lot of time, which is less efficient.

Embodiments of the present disclosure provide a method, a device and a system for processing image tagging information. The method, the device and the system for processing image tagging information according to embodiments of the present disclosure will be described with reference to drawings.

Figure 1:
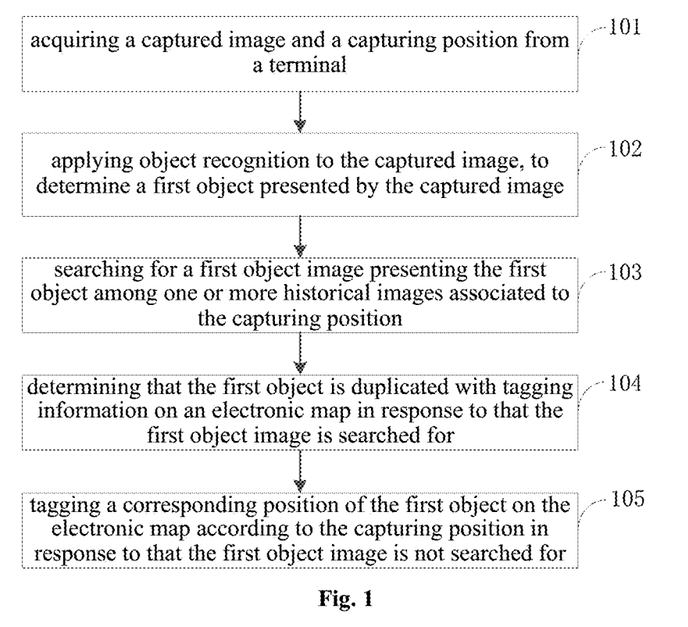
FIG. 1 is a flowchart illustrating a method for processing image tagging information according to embodiments of the present disclosure.

FIG. 1 is a flowchart illustrating a method for processing image tagging information according to embodiments of the present disclosure.

As illustrated in FIG. 1, the method includes the following.

In block 101, a captured image and a corresponding capturing position are acquired from a terminal.

The terminal is a mobile terminal equipped with an image acquisition module, such as a phone, a camera, an iPad, or the like.

In detail, before a server acquires the captured image from the terminal, the terminal may acquire the captured image via the image acquisition module, and may be positioned while capturing the image to acquire the capturing position. As a possible implementation, a global positioning system (GPS) of the terminal may be used for real-time positioning, so as to acquire a current capturing position. As another possible implementation, the current capturing position may be acquired through communication between the terminal and a base station. The method for acquiring the capturing position may be not limited in embodiments.

In block 102, object recognition is applied to the captured image, to determine a first object presented by the captured image.

There may be more than one object presented by the captured image. In order to distinguish the objects from each other, the objects contained in the captured image may be marked as a first object and a second object. The first object is different from the second object.

In detail, the server performs the object recognition on the captured image. As a possible implementation, feature extraction may be performed on the captured image to determine a region by which the object is presented. The object contained in the region may be extracted using optical character recognition (OCR) technique, to acquire the first object.

In block 103, a first target image presenting the first object is searched for among one or more historical images associated to the capturing position.

The first target image refers to an image presenting the first object and stored in a database of the electronic map. For illustrative purpose, the image presenting the first object is called as the first target image. Analogously, an image presenting a second object may be called as a second target image, et cetera.

In detail, according to the capturing position of capturing the image, one or more historical images may be searched for from the database of the electronic map, and the first target image presenting the first object may be searched for.

In block 104, when the first target image is searched for, it is determined that the first object is duplicated with tagging information on the electronic map.

In detail, when the first target image presenting the first object is searched for from the one or more historical images, it is determined that the first object is already tagged on the electronic map. The first object is duplicated tagging information, and there is no need to tag the first object.

In block 105, when the first target image is not searched for, a corresponding position of the first object is tagged on the electronic map according to the capturing position.

In detail, when the first target image is not searched for among the one or more the historical images, the first object is new tagged information. According to the capturing position, the corresponding position of the first object is tagged on the electronic map, thereby realizing to update a point of interest on the electronic map, and improving efficiency of updating.

In the method for processing image tagging information according to embodiments of the present disclosure, the captured image and the corresponding capturing position are acquired from the terminal. The object recognition is applied to the captured image to determine the first object presented by the captured image. The first target image presenting the first object is searched for from the one or more historical images associated with the capturing position. When the first target image is searched for, it is determined that the first object is the duplicated with the tagging information on the electronic map. When the first target image is not searched for, the corresponding position of the first object is tagged on the electronic map according to the capturing position. By obtaining the captured image from the terminal, a judgment operation whether the object presented by the captured image is duplicated with the tagging information on the electronic map is performed. The corresponding position is tagged on the electronic map based on a result of the judgment operation, thereby realizing to quickly recognize and process the object presented by the captured image via the terminal, and improving efficiency of capturing the point of interest on the electronic map.

Figure 2:
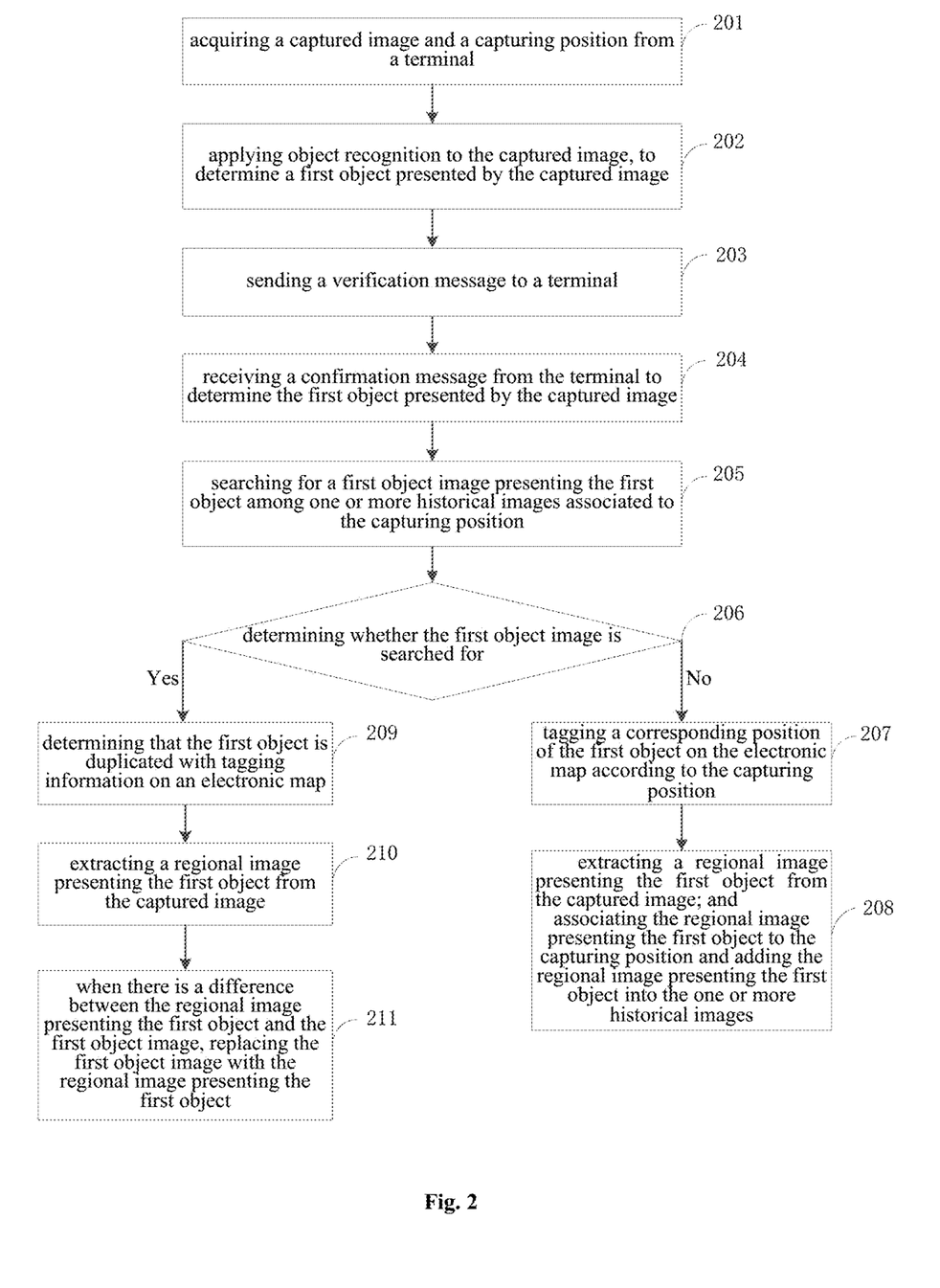
FIG. 2 is a flowchart illustrating another method for processing image tagging information according to embodiments the present disclosure.

In embodiments, there is described that the server obtains the captured image from the terminal and determines whether the first object recognized from the captured image is duplicated with the tagging information on the electronic map. When the first object is not duplicated with the tagging information on the electronic map, in order to further improve accuracy of recognizing the first object by the server, after the first object is recognized, the first object is transmitted to the terminal for confirmation. Thus, embodiments of the present disclosure provide another method for processing image tagging information. FIG. 2 is a flowchart illustrating another method for processing image tagging information according to embodiments of the present disclosure.

As illustrated in FIG. 2, the method may include the following.

In block 201, a captured image and a corresponding capturing position are obtained from a terminal.

In block 202, object recognition is applied to the captured image, to obtain a first object presented by the captured image.

The object to be recognized contained in the captured image corresponds to a map element, such as a point of interest, on an electronic map. The point of interest is generally in a form of billboard in the real world. Therefore, in embodiments, the billboard contained in the captured image is recognized to obtain the object corresponding to the billboard, for illustrative purpose.

Figure 3:
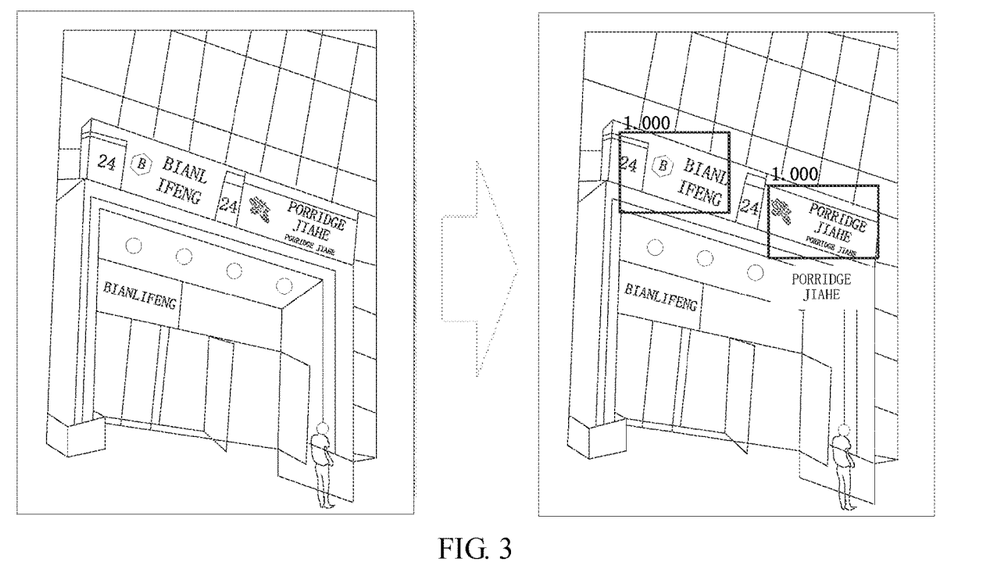
FIG. 3 is a schematic diagram illustrating a recognition result of a captured image according to embodiments of the present disclosure.

In detail, the server applies the object recognition to the captured image acquired from the terminal. FIG. 3 is a schematic diagram illustrating a recognition result of the captured image according to embodiments of the present disclosure. As illustrated in FIG. 3, the captured image acquired from the terminal is illustrated on the left, and the first object "PORRIDGE JIAHE" presented by the captured image corresponding to the billboard information obtained by performing the object recognition via the server on the billboard contained in the captured image is illustrated on the right.

It is to be explained that, the first object presented by the captured image obtained by applying the object recognition on the captured image may be: BIANLIFENG The number illustrated on the image on the right of FIG. 3 denotes a confidence of text recognition, thus indicating an accuracy of the text recognition.

In block 203, a verification message is sent to the terminal.

In detail, the server sends the verification message based on the recognition result to the terminal. The verification message is configured to indicate the first object obtained by applying via the server the object recognition to the captured image.

In block 204, a confirmation message is received from the terminal, to determine the first object presented by the captured image.

In detail, the server receives the confirmation message from the terminal. The confirmation message is used to confirm that the captured image presents the first object. Through the confirmation by a user of the terminal, an accuracy of the first object obtained by the object recognition may be improved, complexity and cost of subsequent data processing are reduced, and processing efficiency may be improved.

In block 205, the first target image presenting the first object is searched for from one or more historical images associated with the capturing position.

The first target image also presents the first object.

In detail, according to the capturing position, from the database of the electronic map, the first target image presenting the first object is searched for from the one of more historical images associated with the capturing position. Therefore, a judgement operation whether the first object presented by the captured image is duplicated with the tagging information on the electronic map is performed, to avoid a duplicated tag of the data, thereby improving efficiency and accuracy of subsequent data processing.

In block 206, it is determined whether the first target image is searched for. If yes, a block 209 is executed. If no, a block 207 is executed.

In block 207, according to the capturing position, a corresponding position of the first object is tagged on the electronic map.

In block 208, from the captured image, a regional image presenting the first image (also called as regional image of the first image) is extracted. The regional image of the first object is associated with the capturing position. The regional image of the first object is added to the one or more historical images.

Figure 4:
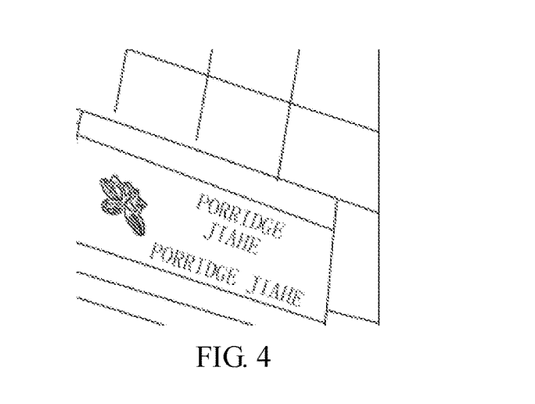
FIG. 4 is a schematic diagram illustrating a regional image according to embodiments of the present disclosure.

In detail, after the corresponding position of the first object is tagged on the electronic map, the regional image presenting the first object is extracted from the captured image. FIG. 4 is a schematic diagram illustrating a regional image according to embodiments of the present disclosure. As illustrated in FIG. 4, the regional image presenting the first object "PORRIDGE JIAHE" is illustrated. The regional image presenting the first object is associated with the capturing position and the regional image is added to the one or more historical images, thereby realizing to update data regarding to the point of interest on the electronic map.

In block 209, it is determined that the first object is duplicated with tagging information on the electronic map.

In block 210, the regional image presenting the first object is extracted from the captured image.

In block 211, when the regional image of the first object is different from the first target image, the first target image is replaced with the regional image of the first object.

In detail, when the first object is duplicated with the tagging information on the electronic map, the regional image presenting the first object is extracted from the captured image. As illustrated in FIG. 4, features of the regional region of the first object and features of the first target image are compared with each other. When there is a difference between the regional image of the first object and the first target image, it is required to update the first target image. For example, when word size and color of the first object in the regional image of the first object is changed with respect to that in the first target image, or when background of the regional image of the first object is changed with respect to that of the first target image, it is determined that a newly obtained regional image of the first object is different from the first target image contained in the one or more historical images. When it is required to update the first target image, the first target image is replaced by the regional image of the first image, thereby realizing to update the corresponding image of the first object, in map data.

In the method for processing image tagging information according to embodiments of the present disclosure, the server obtains the captured image and the corresponding capturing position from the terminal. The object recognition is performed on the captured image. The recognition result is sent to the terminal for confirmation. The first object presented in the captured image is determined based on the result of the confirmation from the terminal. Through the confirmation of the terminal, accuracy of subsequent data processing by the server may be improved, and the efficiency of data processing is increased. Among the one or more historical images associated with the capturing position, the first target image presenting the first object is searched for. When the first target image is searched for, it is determined that the first object is duplicated with the tagging information on the electronic map. The regional image presenting the first object is extracted from the captured image. When the regional image of the first object is different from the first target image, the first target image is replaced with the regional image of the first object. Therefore, when the first object is duplicated with the tagging information, it may be realized to update the corresponding image of the first object on the electronic map. That is, it may be realized to update the data of the electronic map. When the first target image is not searched for, the corresponding position of the first object is tagged on the electronic map according to the capturing position. The extracted regional image of the first object is associated with the capturing position. The regional image of the first object is added to the one or more historical images to realize to update the data of the electronic map. Through a real-time data interaction between the terminal and the server, the fast recognition and processing of the object presented by the captured image may be achieved, thereby improving efficiency and accuracy of obtaining the point of interest on the electronic map.

Figure 5:
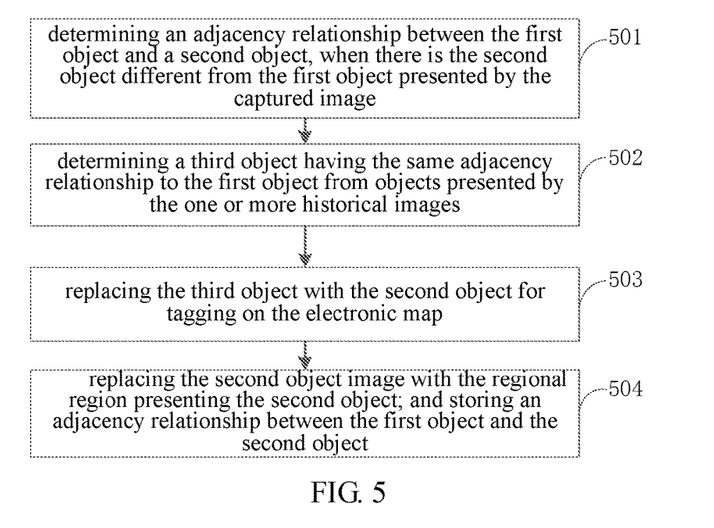
FIG. 5 is flowchart illustrating still another method for processing image tagging information according to embodiments of the present disclosure.

In embodiments, the method for processing tagging information on the electronic map based on the recognized first object and the capturing position in response to that the first object obtained by applying the object recognition to the captured image is described. In practical applications, in addition to the first object, a second object adjacent to the first object may be presented in the captured image. To this end, embodiments of the present disclosure further provide still another method for processing image tagging information. FIG. 5 is a flowchart illustrating still another method for processing image tagging information according to embodiments of the present disclosure. As illustrated in FIG. 5, on the basis of embodiments of FIG. 1, the method may further include the following after the block 102.

In block 501, when there is a first object and a second object different from the first object presented in the captured image, an adjacency relationship between the first object and the second object is determined.

In detail, as illustrated in FIG. 3, when the captured image further presents the second object "BIANLIFENG" different from the first object "PORRIDGE JIAHE", the adjacency relationship between the second object and the first object is determined. For example, the adjacency relationship between the second object "BIANLIFENG" and the first object "PORRIDGE JIAHE" is that illustrated in FIG. 3.

In block 502, among various objects presented by the one or more historical images, a third object which has the same adjacency relationship to the first object is determined.

Figure 6:
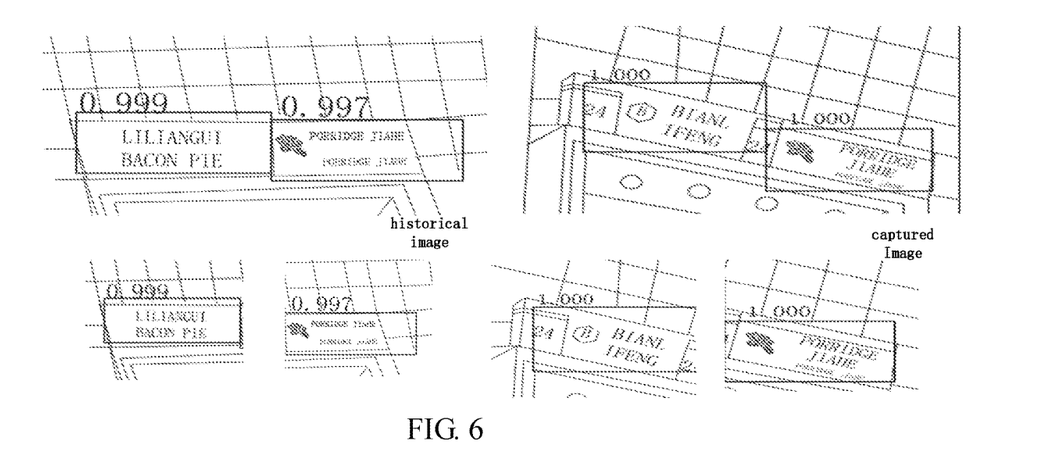
FIG. 6 is a schematic diagram illustrating an adjacency relation between objects according to embodiments of the present disclosure.

In detail, according to the capturing position, the one or more associated historical images are searched. Among various objects presented by the one or more historical images, the third object having the same adjacency relationship to the first object is determined. FIG. 6 is a schematic diagram illustrating an adjacency relationship between objects according to embodiments of the present disclosure. As illustrated in FIG. 6, the third object "LILIANGUI BOCAN PIE" having the same adjacency relationship to the first object "PORRIDGE JIAHE" is searched for from the one or more historical images. The adjacency relationship between the third object "LILIANGUI BOCAN PIE" and the first object "PORRIDGE JIAHE" is determined, which is same with the adjacency relationship between the second object "BIANLIFENG" and the first object "PORRIDGE JIAHE" obtained from the captured image. The numbers illustrated in the image on left of FIG. 6 denote confidences of text recognition, indicating accuracy of result of the text recognition.

In block 503, on the electronic map, the third object is replaced with the second object for tagging.

In detail, the captured image is a newly obtained image. The first object and the second object contained in the captured image are newest object information. As a possible implementation, comparison between features of the second object and features of the third object may be realized by obtaining the second object and the third object through an OCR recognition technique. When it is determined that the second object is different from the third object, the second object instead of the third object is used for tagging on electronic map. Therefore, updating the point of interest on the electronic map may be achieved and the efficiency of updating the point of interest on the electronic device may be improved.

For example, when there is the second object "BIAN-LIFENG" having the adjacency relationship to the first object "PORRIDGE JIAHE" in the captured image, and the third object "LILIANGUI BOCAN PIE" having the same adjacency relationship to the first object "PORRIDGE JIAHE" is searched for among various objects presented by the one or more historical images on the electronic map, the second object "BIANLIFENG" acquired newly is used to replace the third object "LILIANGUI BOCAN PIE" of the historical data. Therefore, updating the point of interest on the electronic map may be realized, and the efficiency of updating the point of interest on the electronic map may be improved.

In block 504, the second target image is replaced by a regional image of the second object and the adjacency relationship between the first object and the second object is stored.

In detail, among the one or more the historical images, the second target image presenting the third object is determined. The regional image presenting the second object is extracted from the captured image. The second target image is replaced by the regional image of the second object and the adjacency relationship between the first object and the second object is stored.

In the method for processing image tagging information according to embodiments of the present disclosure, when there is the second object different from the first object is presented in the captured image, the adjacency relationship between the second object and the first object is determined. The third object having the same adjacency relationship to the first object is searched for from various objects presented by the one or more historical images. The third object is replaced by the second object newly captured on the electronic map, and the target image containing the third object is replaced by the regional image of the second object. The adjacency relationship between the first object and the second object is stored. By acquiring the captured image in real time from the terminal, the object data of the electronic map may be updated using the object information presented by the captured image, thereby improving the efficiency of updating the point of interest on the electronic map.

In order to achieve the above embodiments, the present disclosure further provides a device for processing image tagging information.

Figure 7:
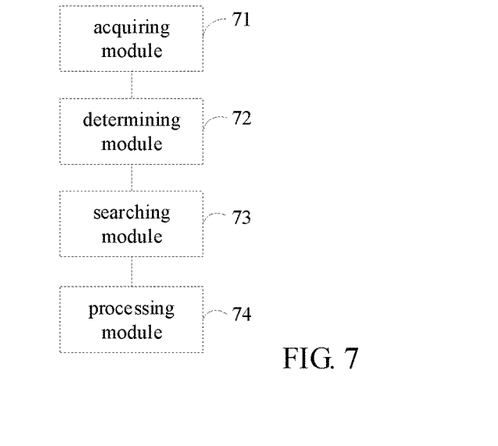
FIG. 7 is a schematic diagram illustrating a device for processing image tagging information according to embodiments of the present disclosure.

FIG. 7 is a block diagram illustrating a device for processing image tagging information according to embodiments of the present disclosure.

As illustrated in FIG. 7, the device includes an acquiring module, a determining module, a searching module, and a processing module.

The acquiring module is configured to acquire a captured image and a corresponding capturing position from a client.

The determining module is configured to apply object recognition to the captured image and to determine a first object presented by the captured image.

The searching module is configured to search for a first target image presenting the first object among one or more historical images associated with the capturing position.

The processing module is configured to determine that the first object is duplicated with tagging information on the electronic map when the first target image is searched for, and to tag a corresponding position of the first object on the electronic map according to the capturing position when the first target image is not searched for.

Further, in a possible implementation of embodiments of the present disclosure, the device further includes an extracting and replacing module.

The extracting and replacing module is configured to extract a regional region presenting the first object from the captured image; and to replace the first target image with the regional image presenting the first object when there is a difference between the regional image presenting the first object and the first target image.

In a possible implementation of embodiments of the present disclosure, the device further includes an extracting and adding module.

The extracting and adding module is configured to extract a regional image presenting the first object from the captured image; and to associate the regional image presenting the first image to the capturing position, and to add the regional image presenting the first object to the one or more historical images.

In a possible implementation of embodiments of the present disclosure, the device further includes a sending module and a receiving module.

The sending module is configured to send a verification message to a terminal. The verification information is configured to indicate the first object.

The receiving module is configured to receive a confirmation message from the terminal. The confirmation message is configured to confirm that the first object exists on the captured image.

In a possible implementation of embodiments of the present disclosure, the device further includes a determining module and a replacing module.

The determining module is configured to determine an adjacency relationship between the first object and a second object when the second object different from the first object is presented by the captured image; and to determine a third object having the same adjacency relationship to the first object from objects presented by the one or more historical images.

The replacing module is configured to replace the third object with the second object for tagging, on the electronic map.

In a possible implementation of embodiments of the present disclosure, the device further includes a determining and storing module.

The determining and storing module is configured to determine a second target image presenting the third object among the one or more historical images; to extract a regional image presenting the second object from the captured image; to replace the second object image with the regional image presenting the second object; and to store an adjacency relationship between the first object and the second object.

It is to be explained that, the foregoing description of the method embodiments is also applicable to the apparatus embodiments, and details are not described herein again.

The division of module of the device for processing image tagging information is only used for exemplification. In other embodiments, the device for processing image tagging information may be divided into other modules according to requirements, for realizing all or part of functions of the device for processing image tagging information.

In the device for processing image tagging information according to embodiments of the present disclosure, the captured image and the corresponding capturing position are acquired from the terminal. The object recognition is applied to the captured image to determine the first object presented by the captured image. The first target image presenting the first object is searched for among the one or more historical images associated with the capturing position. When the first target image is searched for, it is determined that the first object is duplicated with the tagging information on the electronic map. When the first target image is not searched for, the corresponding position of the first object is tagged on the electronic map according to the capturing position. By capturing the captured image by the terminal, a judgement operation whether the first object presented by the captured image is duplicated with the tagging information on the electronic map is performed. The corresponding position of the electronic map is tagged according to a result of the judgment operation, thereby realizing to quickly recognize and process the object presented by the captured image and improving efficiency and accuracy of acquiring the point of interest on the electronic map.

Figure 8:
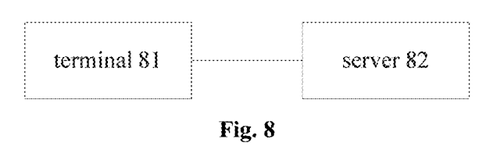
FIG. 8 is a schematic diagram illustrating a system for processing image tagging information according to embodiments of the present disclosure.

In order to achieve the above embodiments, the present disclosure further provides a system for processing image tagging information. FIG. 8 is a schematic diagram illustrating a system for processing image tagging information according to embodiments of the present disclosure. As illustrated in FIG. 8, the system includes a terminal 81 and a server 82.

The terminal 81 is configured to acquire a captured image and to send the captured image and a corresponding capturing position to the server 82.

The server 82 is configured to execute the method for processing image tagging information according to foregoing embodiments according to the captured image and the corresponding capturing position.

In another possible implementation of embodiments, the terminal 81 is configured to receive a verification message sent by the server 82. The verification message is configured to indicate the first object obtained by applying the object recognition to the captured image via the server 82. The terminal 81 is configured to present information of the first object on the captured image. The terminal 81 is further configured to send a confirmation message to the server 82 in response to a user operation, upon determining that the first object exists on the captured image.

In the system for processing image tagging information according to embodiments of the present disclosure, the captured image is acquired by the server from the terminal. The first object recognized from the captured image is sent to the terminal, such that the terminal is configured to confirm the first object, and to send the confirmation message to the server. After the server receives the confirmation message from the terminal, the server is configured to determine whether the first object recognized from the captured image is duplicated with tagging information on the electronic map. The server is configured to tag the corresponding position of the first object on the electronic map when the first object is not duplicated with the tagging information. Therefore, accuracy of recognizing the first object by the server may be improved and efficiency of processing data by the server may be improved.

In order to achieve above embodiments, embodiments of the present disclosure further provide a non-transitory computer readable storage medium, having computer programs stored thereon. When the computer programs are executed by a processor, the foregoing method for processing image tagging information according to embodiments of the present disclosure is executed.

In order to achieve the above embodiments, embodiments of the present disclosure further provide a computer program product. When instructions in the computer program product is executed by a processor, the foregoing method for processing image tagging information according to embodiments of the present disclosure is executed.

Figure 9:
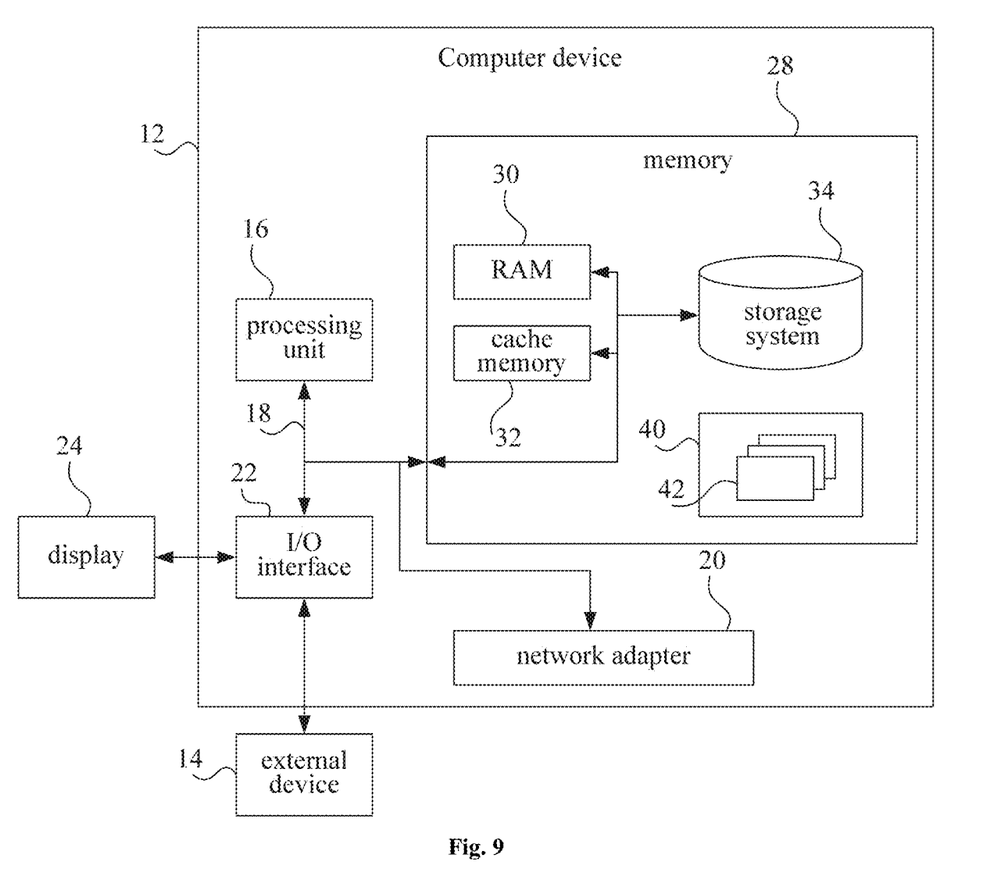
FIG. 9 is a block diagram illustrating an exemplary computer device suitable for realizing implementations of the present disclosure.

FIG. 9 is a block diagram illustrating an exemplary computer device suitable for realizing implementations of the present disclosure. The computer device 12 illustrated in FIG. 9 is merely an example, which does not limit the functions and usage scopes of the embodiments of the present disclosure.

As illustrated in FIG. 9, the computer device 12 is embodied in a form of a general purpose computing device. Components of the computer device 12 may include, but are not limited to, one or more a processor or a processing unit 16, a system memory 28, and a bus 18 connecting various system components (including the system memory 28 and the processing unit 16).

The bus 18 is one or more of several types of bus structures, including a memory bus or memory controller, a peripheral bus, a graphics acceleration port, a processor, or a local bus using any of a variety of bus structures. For example, these architectures include, but are not limited to, an industry standard architecture (hereinafter referred to as ISA) bus, a micro channel architecture (hereinafter referred to as MAC) bus, an enhanced ISA bus, a video electronics standards association (hereinafter referred to as: VESA) local bus and a peripheral component interconnection (PCI) bus.

The computer device 12 typically includes a variety of computer system readable media. These media may be any available media that can be accessed by the computer device 12, including both volatile and nonvolatile media, removable and non-removable media.

The memory 28 may include a computer system readable medium in the form of volatile memory, such as a random access memory (hereinafter referred to as: RAM) 30 and/or a cache memory 32. The computer device 12 may further include other removable/non-removable, volatile/non-volatile computer system storage media. By way of example only, the storage system 34 may be used to read and write non-removable and non-volatile magnetic media (not illustrated in FIG. 9, commonly referred to as "hard disk drives"). Although not illustrated in FIG. 9, a magnetic disk driver for reading from and writing to a removable and non-volatile disk (for example, a "floppy disk"), and a compact disk driver for reading from and writing to a removable and non-volatile disk (for example, a compact disc read only memory (hereinafter referred to as CD-ROM), a digital video disc read only memory (hereinafter referred to as DVD-ROM) or other optical media) may be provided. In these cases, each driver may be connected to the bus 18 via one or more data medium interfaces. The memory 28 may include at least one program product having a set (e.g., at least one) of program modules which are configured to perform the functions of the embodiments of the present disclosure.

A program/practical means 40 having a set (at least one) of program modules 42 may be stored, for example, in the memory 28. Such program module 42 includes, but is not limited to, an operating system, one or more applications, other program modules, and program data. An implementation of the network environment may be included in each or a combination of these examples. The program module 42 typically performs the functions and/or methods of the embodiments described herein.

The computer device 12 may also communicate with one or more external devices 14 (e.g., a keyboard, a pointing device, a display 24, etc.), and may also communicate with one or more devices enabling a user to interact with the computer device 12, and/or communicate with any device (e.g., a network card, modem, etc.) enabling the computer device 12 to communicate with one or more other computing devices. This communication can take place via an input/output (I/O) interface 22. Moreover, the computer device 12 may also communicate with one or more network (for example, a local area network (hereinafter referred to as LAN), a wide area network (hereinafter referred to as WAN), and/or a public network, such as the Internet) via the network adapter 20. As illustrated in drawings, the network adapter 20 communicates with other modules of the computer device 12 via the bus 18. It should be understood that, although not illustrated in the drawings, other hardware and/or software modules may be utilized in conjunction with the computer device 12, including but not limited to: a microcode, a device driver, a redundant processing unit, an external disk drive array, a RAID system, a tape drive, a data backup storage system, etc.

The processing unit 16 executes various functional applications and data processing by running programs stored in the system memory 28, for example, implementing the methods mentioned in the foregoing embodiments.

In the description of the present disclosure, terms such as "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

In addition, terms such as "first" and "second" are used herein for purposes of description and are not intended to indicate or imply relative importance or significance. Furthermore, the feature defined with "first" and "second" may comprise one or more this feature distinctly or implicitly. In the description of the present disclosure, "a plurality of" refers to at least two, such as two, three etc., unless specified otherwise.

Any procedure or method described in the flow charts or described in any other way herein may be understood to comprise one or more modules, portions or parts for storing executable codes that realize particular logic functions or procedures. Moreover, advantageous embodiments of the present disclosure comprise other implementations in which the order of execution is different from that which is depicted or discussed, including executing functions in a substantially simultaneous manner or in an opposite order according to the related functions, which should be understood by those skilled in the art.

The logic and/or steps described in other manners herein or illustrated in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but not an exhaustive list: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:

1. A method for processing image tagging information, comprising:
   acquiring a captured image and a capturing position from a terminal;
   applying object recognition to the captured image, to determine a first object presented by the captured image;
   obtaining a first target image presenting the first object among one or more historical images associated to the capturing position;
   extracting a regional image presenting the first object from the captured; and
   modifying the tagging information of the first object on an electronic map by replacing the first target image with the regional image, in response to determining that word size or color of the first object in the regional image is different from that of the first target image, or in response to determining that a background of the regional image is different from that of the first target image.

2. The method of claim 1, wherein, after the first target image is not found, the method further comprises:
   extracting a regional image presenting the first object from the captured image; and
   associating the regional image presenting the first object to the capturing position and adding the regional image presenting the first object into the one or more historical images.

3. The method of claim 1, after applying the object recognition to the captured image, further comprising:
   sending a verification message to the terminal, the verification message being configured to indicate the first object; and
   receiving a confirmation message from the terminal, the confirmation message being configured to confirm that the first object is presented by the captured image.

4. The method of claim 1, after applying the object recognition to the captured image, further comprising:
   determining an adjacency relationship between the first object and a second object, when there is the second object different from the first object presented by the captured image;
   determining a third object having the same adjacency relationship to the first object from objects presented by the one or more historical images; and
   replacing the third object with the second object for tagging on the electronic map.

5. The method of claim 4, after replacing the third object with the second object for tagging, further comprising:
   determining a second object image presenting the third object among the one or more historical images;
   extracting a regional region presenting the second object from the captured image;
   replacing the second object image with the regional region presenting the second object; and
   storing an adjacency relationship between the first object and the second object.

6. A server, comprising a memory, a processor and computer programs stored in the memory and executable by the processor, wherein, when the computer programs are executed, the processor is configured to:
   acquire a captured image and a capturing position from a terminal;
   apply object recognition to the captured image, to determine a first object presented by the captured image;
   search for a first target image presenting the first object among one or more historical images associated to the capturing position;
   extract a regional image presenting the first object from the captured image in response to that the first target image is found;
   modify the tagging information of the first object on an electronic map by replacing the first target image with the regional image, in response to determining that word size or color of the first object in the regional image is different from that of the first target image, or in response to determining that a background of the regional image is different from that of the first target image; and
   tag a corresponding position of the first object on the electronic map according to the capturing position in response to that the first target image is not found.

7. The server of claim 6, wherein the processor is further configured to:

extract a regional image presenting the first object from the captured image; and associate the regional image presenting the first object to the capturing position and add the regional image presenting the first object into the one or more historical images.

8. The server of claim 6, wherein after the object recognition is applied to the captured image, the processor is further configured to:

send a verification message to the terminal, the verification message being configured to indicate the first object; and receive a confirmation message from the terminal, the confirmation message being configured to confirm that the first object is presented by the captured image.

9. The server of claim 6, wherein after the object recognition is applied to the captured image, the processor is further configured to: determine an adjacency relationship between the first object and a second object, when there is the second object different from the first object presented by the captured image;

determine a third object having the same adjacency relationship to the first object from objects presented by the one or more historical images; and replace the third object with the second object for tagging on the electronic map.

10. The server of claim 9, wherein the third object is replaced with the second object for tagging, the processor is further configured to:

determine a second object image presenting the third object among the one or more historical images;

extract a regional region presenting the second object from the captured image;

replace the second object image with the regional region presenting the second object; and store an adjacency relationship between the first object and the second object.

11. A non-transitory computer readable storage medium, having computer programs stored thereon, wherein when the computer programs are executed by a processor, a method for processing image tagging information is executed, the method comprising:

acquiring a captured image and a capturing position from a terminal;

applying object recognition to the captured image, to determine a first object presented by the captured image;

obtaining a first target image presenting the first object among one or more historical images associated to the capturing position;

extracting a regional image presenting the first object from the captured;

modifying the tagging information of the first object on an electronic map by replacing the first target image with the regional image, in response to determining that word size or color of the first object in the regional image is different from that of the first target image, or in response to determining that a background of the regional image is different from that of the first target image; and tagging a corresponding position of the first object on the electronic map according to the capturing position in response to that the first target image is not found.

12. The non-transitory computer readable storage medium of claim 11, wherein after the first target image is not found, the method further comprises:

extracting a regional image presenting the first object from the captured image; and associating the regional image presenting the first object to the capturing position and adding the regional image presenting the first object into the one or more historical images.

13. The non-transitory computer readable storage medium of claim 11, wherein, after applying the object recognition to the captured image, the method further comprises:

sending a verification message to the terminal, the verification message being configured to indicate the first object; and receiving a confirmation message from the terminal, the confirmation message being configured to confirm that the first object is presented by the captured image.

14. The non-transitory computer readable storage medium of claim 11, wherein, after applying the object recognition to the captured image, the method further comprises:

determining an adjacency relationship between the first object and a second object, when there is the second object different from the first object presented by the captured image;

determining a third object having the same adjacency relationship to the first object from objects presented by the one or more historical images; and replacing the third object with the second object for tagging on the electronic map.

15. The non-transitory computer readable storage medium of claim 14, wherein, after replacing the third object with the second object for tagging, the method further comprises:

determining a second object image presenting the third object among the one or more historical images;

extracting a regional region presenting the second object from the captured image;

replacing the second object image with the regional region presenting the second object; and storing an adjacency relationship between the first object and the second object.

\* \* \* \* \*